United States Patent
Menon et al.

(10) Patent No.: US 6,397,229 B1
(45) Date of Patent: May 28, 2002

(54) STORAGE-CONTROLLER-MANAGED OUTBOARD INCREMENTAL BACKUP/RESTORE OF DATA

(75) Inventors: Jaishankar Moothedath Menon, San Jose, CA (US); Richard Kent Treiber, Tillamook, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/017,084

(22) Filed: Feb. 2, 1998

(51) Int. Cl.[7] .............................................. G06F 17/30
(52) U.S. Cl. ...................................... 707/204; 711/162
(58) Field of Search .............................. 707/200–206; 711/141–146, 154–156, 159–162, 133–136

(56) References Cited

U.S. PATENT DOCUMENTS

| | | | |
|---|---|---|---|
| 4,686,620 A | * 8/1987 | Ng ................................ | 707/10 |
| 4,833,679 A | 5/1989 | Anderson et al. ............. | 714/758 |
| 5,210,866 A | 5/1993 | Milligan et al. ................ | 714/6 |
| 5,263,154 A | 11/1993 | Eastridge et al. .............. | 714/6 |
| 5,276,860 A | 1/1994 | Fortier et al. ................... | 714/6 |
| 5,321,832 A | * 6/1994 | Tanaka et al. ............... | 707/204 |
| 5,375,232 A | 12/1994 | Legvold et al. ............. | 711/162 |
| 5,379,398 A | 1/1995 | Cohn et al. ................. | 711/154 |
| 5,454,099 A | 9/1995 | Myers et al. .................. | 714/6 |
| 5,455,946 A | 10/1995 | Mohan et al. .............. | 707/202 |
| 5,457,796 A | 10/1995 | Thompson .................. | 707/203 |
| 5,497,483 A | 3/1996 | Beardsley et al. ............. | 714/1 |
| 5,522,037 A | * 5/1996 | Kitagawa et al. ............. | 714/40 |
| 5,535,381 A | 7/1996 | Kopper ........................ | 710/52 |
| 5,559,991 A | 9/1996 | Kanfi .......................... | 711/162 |
| 5,574,906 A | 11/1996 | Morris .......................... | 707/1 |
| 5,634,052 A | 5/1997 | Morris .......................... | 707/1 |
| 5,909,700 A | * 6/1999 | Bitner et al. ................. | 711/162 |
| 5,930,824 A | * 7/1999 | Anglin et al. ................ | 711/162 |
| 6,035,412 A | * 3/2000 | Tamer et al. .................. | 714/6 |
| 6,141,773 A | * 10/2000 | St. Pierre et al. ............. | 714/20 |

\* cited by examiner

*Primary Examiner*—Maria N. Von Buhr
(74) *Attorney, Agent, or Firm*—Merchant, Gould, Smith, Edell, Welter & Schmidt; Altera Law Group, LLC

(57) ABSTRACT

A storage-controller-managed outboard incremental backup/restore of data. An indicator is assigned to an associated portion of data stored in a data storage device, wherein the indicator resides in a memory of a storage controller coupled to the data storage device. A value of the indicator residing within the memory of the storage controller is set when the associated portion of the data has changed. The associated portion of the data stored in the data storage device is backed using the storage controller when the value of the indicator residing within the memory of the storage controller is set. The value of the indicator residing within the memory of the storage controller is cleared when the associated portion of the data has been backed up.

15 Claims, 2 Drawing Sheets

STORAGE-CONTROLLER-MANAGED OUTBOARD INCREMENTAL BACKUP/ RESTORE OF DATA

BACKGROUND OF THE INVENTION

1. Field of the Invention

This invention relates in general to improvements in the field of computer systems having backup/restore or archive/retrieve subsystems, and more particularly, to storage-controller-managed outboard incremental backup/restore of data.

2. Description of Related Art

In a data processing system, a backup/restore subsystem is typically used to save a recent copy or version of a file or portion thereof on some form of backup data storage device, such as magnetic or optical disk drives, tape drives, or other memory. The backup/restore subsystem is used to protect against loss of data. For example, if an on-line version of a file is destroyed, corrupted, deleted, or changed because of power failure, hardware, or software error, user error or some other type of problem, the latest version of that file which is stored in a backup/restore subsystem can be restored and therefore the risk of loss of data is minimized. It is readily apparent that backup/restore subsystems are and will remain an important part of the field of data processing.

At the present time, the majority of backup/restore subsystems are executed by host computers and manage the backup/restore functions for one or more data storage devices connected thereto. Typically, a backup operation is performed on a predetermined schedule such as once each day, week, month, or each time that a file has been updated and saved.

Backup/restore subsystems typically utilize the full backup method and/or the incremental backup method to enable the storage of and retrieval of multiple versions of a given file. The full backup method backs up an entire collection of files, or a file system, regardless of whether individual files in that collection have been updated or not. Often, multiple full versions of each file are maintained on a storage device in the full backup method. The incremental backup method is an alternative to the full backup method where only those files, in any given collection of files, which have been changed since the previous incremental or full backup are backed up.

Backup/restore subsystems generally consume a large part of the processing power of a host computer and the data storage devices attached thereto because of the large amounts of data being accessed. Those engaged in the field of data processing and especially in the field of backup/restore subsystems are continuously striving to find improved methods and systems to reduce the demands of backup/restore subsystems.

SUMMARY OF THE INVENTION

To overcome the limitations in the prior art described above, and to overcome other limitations that will become apparent upon reading and understanding the present specification, the present invention discloses a method, apparatus, and article of manufacture for a storage-controller-managed outboard incremental backup/restore of data. An indicator is assigned to an associated portion of data stored in a data storage device, wherein the indicator resides in a memory of a storage controller coupled to the data storage device. A value of the indicator residing within the memory of the storage controller is set when the associated portion of the data has changed. The associated portion of the data stored in the data storage device is backed using the storage controller when the value of the indicator residing within the memory of the storage controller is set. The value of the indicator residing within the memory of the storage controller is cleared when the associated portion of the data has been backed up.

An object of the present invention is to provide for storage controller management of backup/restore operations. Another object is to provide for continuous, outboard incremental backup of data. Yet another object is to reduce the overhead on the host computer of performing backup/restore operations on attached data storage devices. A further object is to provide more reliable backup/restore methods.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
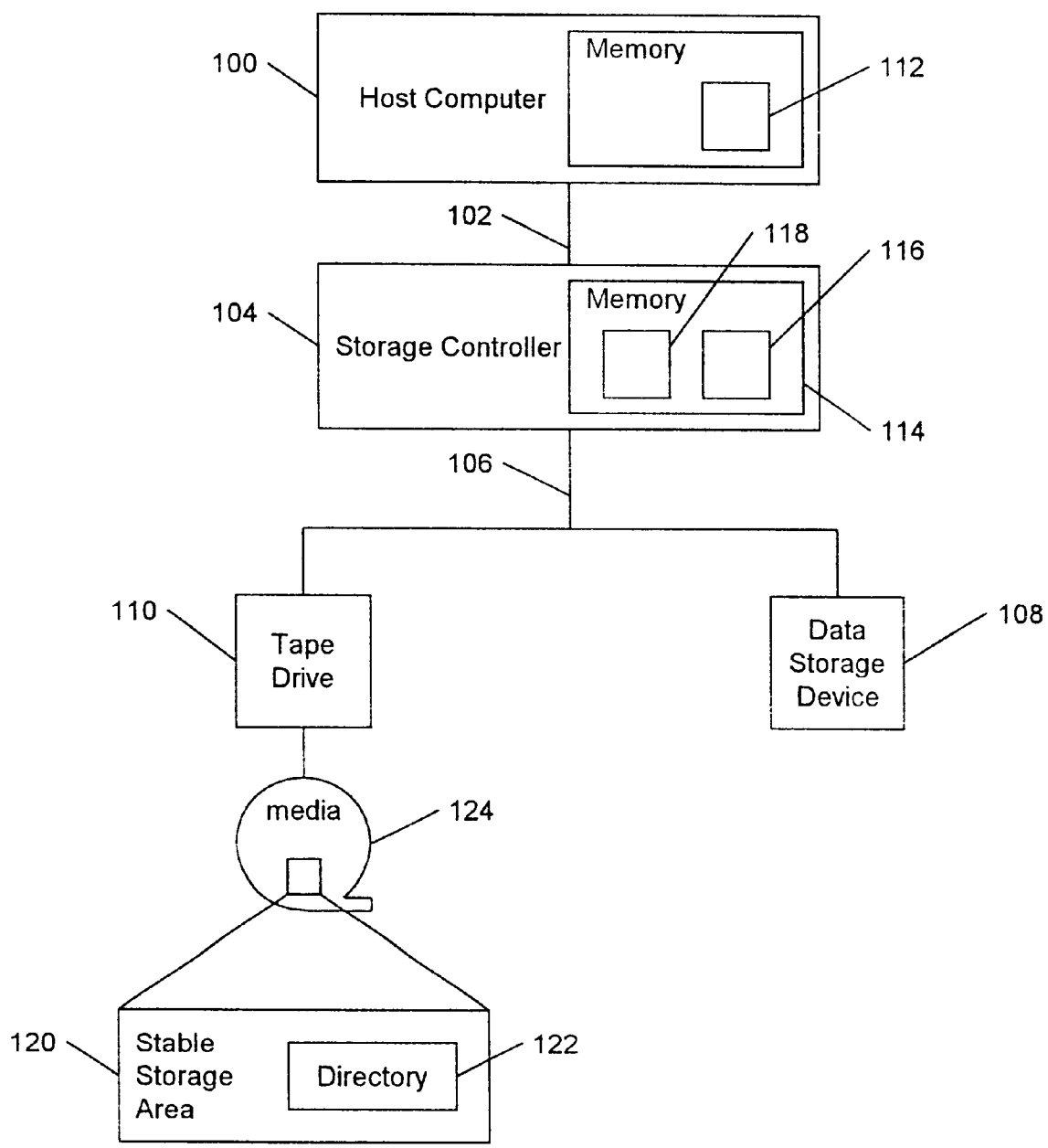
FIG. 1 is an exemplary hardware environment used to implement the preferred embodiment of the invention.

FIG. 1 is an exemplary hardware environment used to implement the preferred embodiment of the invention. A host computer 100 is coupled via a bus 102 to a storage controller 104, which itself is coupled via an I/O channel 106 to one or more data storage devices 108 and 110. In the preferred embodiment, the data storage device 108 comprises a direct access storage device (DASD) such as a magnetic or optical disk drive and the data storage device 110 comprises a sequential access storage device (SASD) such as a tape drive or a direct access storage device (DASD) such as a magnetic or optical disk drive. Of course, those skilled in the art will recognize that any data storage device may be used with the present invention.

The host computer 100 executes a computer program 112 that controls the operation of the host computer 100 and its interaction with the storage controller 104. In the preferred embodiment, the computer program 112 comprises a backup/restore utility or database management system, although other computer programs may be used as well.

Similarly, the storage controller 104 has its own memory 114 and executes a computer program 116 that controls the operation of the storage controller 104 and its interaction with the host computer 100, data storage device 108, and tape drive 110. In the preferred embodiment, the computer program 116 provides the backup/restore logic, although other functions may be provided as well.

The storage controller 104 uses a bit map 118 stored in its memory 114 to monitor the data storage device 108 and determine when data on the data storage device 108 has changed. When the bit map 118 indicates that portions of the data (such as sectors) stored on the data storage device 108 have changed, the storage controller 104 backs up those changed portions onto the tape drive 110. In a preferred embodiment, the controller 104 contains the bit map 118, and the host computer 100 does not. However, either the host computer 100, the controller 104, or both, can contain the bit map 118. The host computer 100 requests the bit map 118 from the controller 104, examines the bit map 118, and determines whether a backup for the changed data on the data storage device 108 is required. The controller 104 does not perform the backup or control the backup operation of the data storage device 108.

In another embodiment, this backup operation is continuous, thereby providing a constant outboard incremental backup of data from the data storage device 108.

Thus, according to the present invention, the storage controller 104 performs the operations of a backup/restore subsystem substantially independently of the host computer 100, although such operations may be initiated or managed by the computer program 112. As a result of this storage-controller-managed outboard backup/restore of data, the storage controller 104 and the computer program 116 relieve the host computer 100 and the computer program 112 of most of the functions associated with backup/restore operations.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Those skilled in the art will also recognize that the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

Host Computer Operations

The computer program 112 executed by the host computer 100 generally provides the control functions for the backup/restore operations performed by the storage controller 104. The computer program 112 accepts and processes requests for the backup/restore of data table spaces, files, groups of files, or entire file systems on the data storage device 108, as single or multiple units to be backed up and/or restored together.

The computer program 112 interacts with operating system of the host computer 100 that control file allocation to translate the location of the specified data from a logical name (file specification) to a physical identifier (logical unit number, physical address, offset, size, etc.). Further, the computer program 112 communicates this information to the storage controller 104.

These functions are performed by the host computer 100 communicating with the storage controller 104, passing the requests to the storage controller 104, receiving an acceptance/rejection generated by the computer program 116, returning the acceptance/rejection to the host computer 100, and notifying the host computer 100 when the operation is completed. These communication can also be associated with a particular request or option set by the user, e.g., whether to keep previous backups, priority, merger of incremental backups, etc.

Storage Controller Operations

The computer program 116 executed by the storage controller 104 provides backup/restore support by performing functions in real-time, thereby alleviating the overhead of performing these tasks upon command in the host computer 100. This separation of the backup/restore operations from the host computer 100 allows the storage controller 104 to keep track of those areas of the data storage device 108 that require backup, and provide the backup/restore operations incrementally as an independent process or upon command from the host computer 100.

The computer program 116 generates the acceptance/rejection of the backup/restore request, returns it to the computer program 112 in the host computer 100, and notifies the computer program 112 in the host computer 100 when the backup/restore is complete and again available for another operation. The computer program 116 accepts requests to restore the portion or portions of data to be restored on the data storage device 108 to its previous location or a new location. The request can be for a portion of data as of a specified time period, e.g., the latest backup or any earlier backup. The computer program 116 can also accept requests for information on existing backups, to delete backups, as well as to remove or "unregister" sectors that require backup.

The bit map 118 stored in the memory 114 of the storage controller 104 provides a high-performance mechanism that allows the computer program 116 to track changes to data storage device 108. Preferably, the memory 114 comprises non-volatile RAM, thereby providing reasonably high availability for the bit map 118. Further, the bit map 118 may be stored permanently on secondary storage, such as the data storage device 108 and/or the tape drive 110, and thereafter cached in the non-volatile RAM.

Each bit in the bit map 118 is assigned to one portion of the data stored on the data storage device 104 (normally a sector), wherein the bit is set when the sector has been changed and the bit is cleared after the sector is backed up. In the context of this specification, a bit may be set to a value of 1 and cleared to a value of 0, or alternatively, a bit may be set to a value of 0 and cleared to a value of 1. To minimize the amount of memory 114 required for the bit map 118, e.g., 256 K bytes for a 1.0 GB disk drive at 1 bit per 512 byte sector, the size of the portion of data on the data storage device 104 associated with each bit can be increased, e.g., 64 K bytes for a 1.0 GB disk drive at 1 bit per 4096 byte sector.

At initial installation, before data is stored on the data storage device 108, the bit map 118 is created, the association between bits and sectors is established, and the bits are cleared. Thereafter, once a sector is changed on the data storage device 108, but before completing a backup operation for the sector to the tape drive 110, an indication of the modification is saved by setting the bit associated with the sector in the bit map 118 stored in the memory 114 of the storage controller 104. Once the sector is backed up to the tape drive 110, an indication of the backup operation is saved by clearing the bit associated with the sector in the bit map 118 stored in the memory 114 of the storage controller 104.

The storage controller 104 accepts requests from the host computer 100 to perform full backup/restore operations for all sectors of the data storage device 108, or alternatively, to perform incremental backup/restore operations for specified sectors of the data storage device 108, or alternatively, to perform incremental backup/restore operations for all sectors of the data storage device 108 that have their associated bits set.

Backup operations may be performed by the storage controller 104 using "point in time copy" techniques, "snapshot" techniques, or by simple copy commands that rely on the host computer 100 to not perform write operations, or to manage the implications of write operations during the backup process. Further, backup operations can be continuous, wherein sectors are backed up by the storage controller 104 whenever their associated bits in the bit map 118 are set.

Backed up data can be written directly to the tape drive 110 attached to the storage controller 104, or to another data storage device 110 attached to the storage controller. In addition, backed up data can be written to other devices not directly attached to the storage controller 104, e.g., other devices attached to the bus 102 or to the host computer 100 itself.

When the backup operation is completed, information about the backed up data is recorded in a directory 120 in a stable storage area 122 resident on the media 124 of the tape drive 110. This information typically includes identification of the source of the data, including an identification of the data storage device 108 and an identification of a sector's location on the data storage device 108, and the date and time that the backup operation was performed.

The storage controller 104 also accepts requests from the computer program 112 executed by the host computer 100 to perform restore operations for one or more sectors of the data storage device 108. Numerous criteria for the restore operation can be specified, such as time period, individual sectors, or all sectors.

The restore function is performed by the storage controller 104 locating backed up sectors using the information recorded in the directory 120 in the stable storage area 122 resident on the media 124 of the tape drive 110. Once the desired sectors are identified, the storage controller 104 copies the selected sectors from the tape drive 110 to their identified locations on the data storage device 108.

If there is more than one backup of the selected sectors in the selected time period, the storage controller 104 can execute a merge operation of the backed up sectors during restore operations from the tape drive 110. The merge operation identifies and gathers only the most recent copy of each sector from the tape drive 110 for the specified time period of the restore operation, and then restores that copy to the data storage device 108, to avoid restoring multiple copies of each sector.

The storage controller 104 can also merge multiple incremental backups stored on the tape drive 110 within a specified time period. This merge operation allows multiple backed up copies of a sector within a specified time period to be merged/eliminated so that only the single most recent copy of the sector remain. Such a merge operation would also require the storage controller to update/consolidate the information recorded in the directory 120 in the stable storage area 122 resident on the tape drive 110 media.

The merge operation reduces the amount of space required for backups on the media 124 of the tape drive 110, and speeds up any required restore operation for the data. If all of the sources of the merges are retained, the ability to recover all of the backups is retained as well.

Finally, the storage controller 104 also accepts requests from the computer 100 for information on existing backups, requests to delete backups, and requests to unregister units of backup. The storage controller 104 then processes the request as appropriate and returns information to the computer 100.

Flowchart

Figure 2:
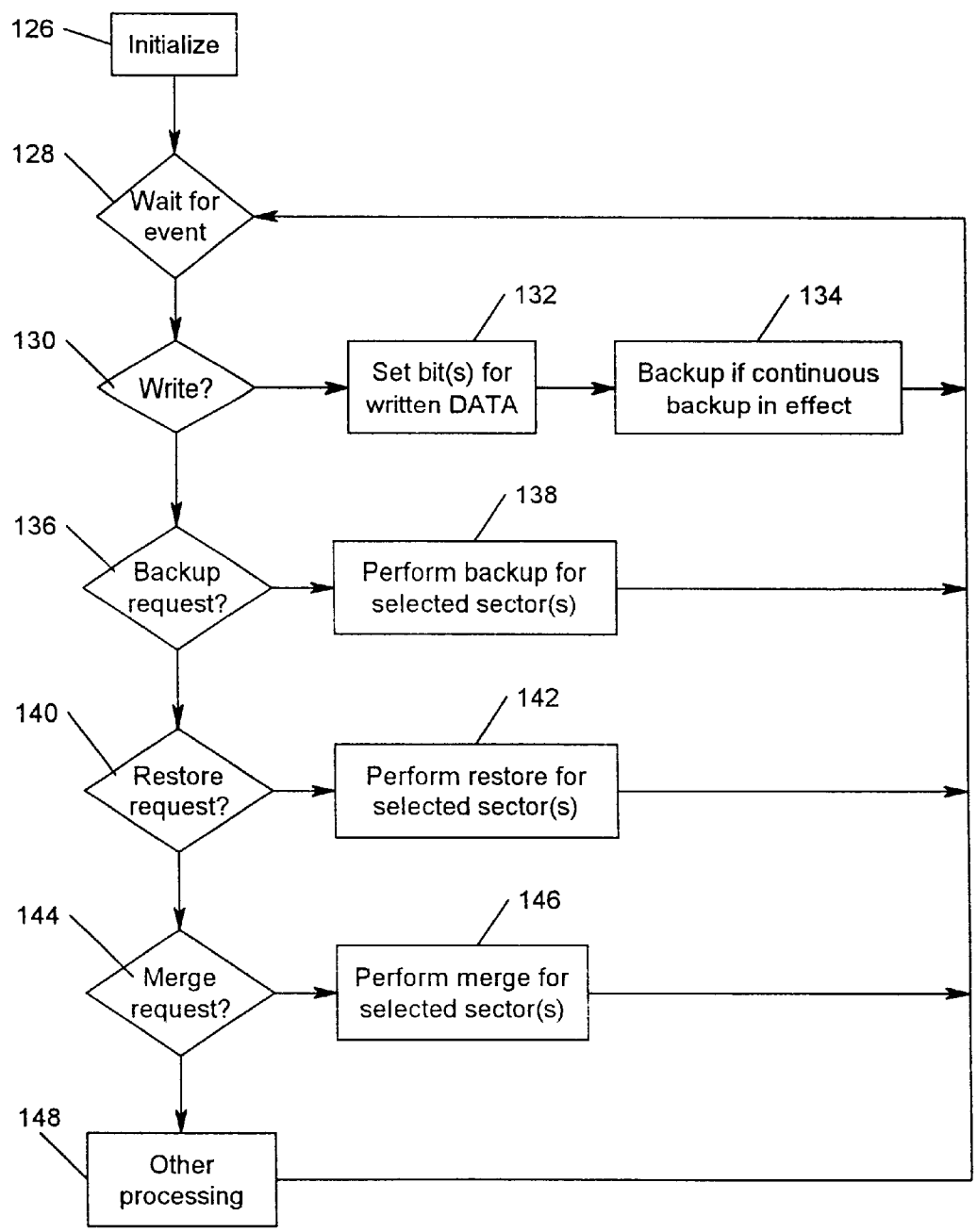
FIG. 2 is a flowchart illustrating the logic performed by the present invention.

FIG. 2 is a flowchart illustrating the logic performed by the present invention.

Block 126 represents the initialization of the storage controller 104. Generally, this step includes loading the computer program 118, optionally loading the bit map 118 from secondary storage (if necessary), and verifying the accuracy of the bit map 118.

Block 128 is a decision block that represents the storage controller 104 waiting for the next event to occur. Thereafter, control transfers to Blocks 130–148.

Block 130 is a decision block that determines whether the event is a write operation to the data storage device 108. If so, control transfers to Block 132; otherwise, control transfers to Block 136. Block 132 represents the storage controller 104 setting the bit(s) associated with the written portion(s) of data. Block 134 represents the storage controller 104 performing a backup operation for those portion(s) of the data stored on the data storage device 108 that have set bit(s) in the bit map 118, if a continuous outboard incremental backup operation is in effect, and then clearing the bit(s) associated with the backed up portion(s) of data.

Block 136 is a decision block that determines whether the event is a backup request for the data storage device 108 received from the host computer 100. If so, control transfers to Block 138; otherwise, control transfers to Block 140. Block 138 represents the storage controller 104 performing a backup operation for the portion(s) of data stored on the data storage device 108 that have set bit(s) in the bit map 118, and then clearing the bit(s) associated with the backed up portion(s) of data.

Block 140 is a decision block that determines whether the event is a restore request for the data storage device 108 received from the host computer 100. If so, control transfers to Block 142; otherwise, control transfers to Block 144. Block 142 represents the storage controller 104 performing a restore operation for the selected portion(s) of data.

Block 144 is a decision block that determines whether the event is a merge request for the data storage device 108 received from the host computer 100. If so, control transfers to Block 146; otherwise, control transfers to Block 148. Block 146 represents the storage controller 104 performing a merge operation for the selected portion(s) of data.

Finally, Block 146 represents the storage controller 104 performing other processing functions.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for backing up data stored on a data storage device coupled to a host computer, comprising the steps of:

assigning an indicator to a unique data storage area within the data storage device, wherein the unique data storage area contains data, and wherein the indicator resides in a memory of a storage controller coupled to the data storage device;

setting a value of the indicator residing within the memory of the storage controller when the data stored in the unique data storage area has changed;

transferring the data stored in the unique data storage area of the data storage device to a backup storage device using the storage controller when the value of the indicator residing within the memory of the storage controller is set; and clearing the value of the indicator residing within the memory of the storage controller when the data has been transferred.

2. The method of claim 1, further comprising the step of recording information about the transferred data in a directory in a stable storage area when the transfer is complete.

3. The method of claim 2, wherein the recorded information is selected from a group comprising an identification of the data storage device, an identification of the data's unique location on the data storage device, and a time that the transfer was performed.

4. The method of claim 1, further comprising the step of merging a plurality of copies of the transferred data when there is more than one copy of the transferred data in a selected time period, so that only a most recent copy of the data is retained.

5. The method of claim 1, wherein the setting the value of the indicator further comprises storing a bitmap in the memory of the storage controller and each bit in the bitmap corresponds to a physical sector of the data storage device indicating the sector's necessity for backup, wherein a size of the physical sector of the data storage device associated with each bit can be varied.

6. An apparatus for backing up data, comprising:

a data storage device; and a storage controller, connected to the data storage device, for assigning an indicator to a unique data storage area of the data storage device, wherein the unique data storage area contains data, and wherein the indicator resides in a memory of the storage controller coupled to the data storage device, for setting a value of the indicator residing within the memory of the storage controller when the data stored in the unique data storage area has changed, for backing up the data stored in the unique data storage area of the data storage device using the storage controller when the value of the indicator residing within the memory of the storage controller is set, and for clearing the value of the indicator residing within the memory of the storage controller when the data has been backed up.

7. The apparatus of claim 6, wherein the indicator comprises a bitmap that is stored in the memory of the storage controller and each bit in the bitmap corresponds to a physical sector of the data storage device indicating the sector's necessity for backup, wherein a size of the physical sector of the data storage device associated with each bit can be varied.

8. The apparatus of claim 6, further comprising a directory in a stable storage area for recording information about the backed up data when the backing up is complete.

9. The apparatus of claim 8, wherein the recorded information is selected from a group comprising an identification of the data storage device, an identification of the data's unique location on the data storage device, and a time that the backing up was performed.

10. The apparatus of claim 6, further comprising a merging of a plurality of copies of the backed up portion of the data when there is more than one copy of the backed up data in a selected time period, so that only a most recent copy of the data is retained.

11. An article of manufacture comprising a computer program carrier readable by a controller and embodying one or more instructions executable by the controller to perform method steps for backing up data stored on a data storage device coupled to the controller, the method comprising the steps of:

assigning an indicator to a unique data storage area within the data storage device, wherein the unique data storage area contains data, and wherein the indicator resides in a memory of a storage controller coupled to the data storage device;

setting a value of the indicator residing within the memory of the storage controller when the data stored in the unique data storage area has changed;

transferring the data stored in the unique data storage area of the data storage device to a backup storage device using the storage controller when the value of the indicator residing within the memory of the storage controller is set; and clearing the value of the indicator residing within the memory of the storage controller when the data has been transferred.

12. The article of manufacture of claim 11, wherein the indicator comprises a bitmap that is stored in the memory of the storage controller and each bit in the bitmap corresponds to a physical sector of the data storage device indicating the sector's necessity for backup, wherein a size of the physical sector of the data storage device associated with each bit can be varied.

13. The article of manufacture of claim 11, further comprising a directory in a stable storage area for recording information about the backed up data when the backing up is complete.

14. The article of manufacture of claim 13, wherein the recorded information is selected from a group comprising an identification of the data storage device, an identification of the data's unique location on the data storage device, and a time that the backing up was performed.

15. The article of manufacture of claim 11, further comprising a merging of a plurality of copies of the backed up data when there is more than one copy of the backed up data in a selected time period, so that only a most recent copy of the portion of the data is retained.

* * * * *